(12) United States Patent
Morioka et al.

(10) Patent No.: US 9,042,891 B2
(45) Date of Patent: May 26, 2015

(54) METHOD FOR PERFORMING HANDOVER, USER EQUIPMENT, BASE STATION, AND RADIO COMMUNICATION SYSTEM

(75) Inventors: Yuichi Morioka, Tokyo (JP); Hiroaki Takano, Saitama (JP); Ryo Sawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/499,822

(22) PCT Filed: Aug. 4, 2010

(86) PCT No.: PCT/JP2010/063180
§ 371 (c)(1),
(2), (4) Date: Apr. 2, 2012

(87) PCT Pub. No.: WO2011/052275
PCT Pub. Date: May 5, 2011

(65) Prior Publication Data
US 2012/0202501 A1    Aug. 9, 2012

(30) Foreign Application Priority Data
Oct. 30, 2009  (JP) .............................. P2009-250806

(51) Int. Cl.
*H04W 36/00* (2009.01)
*H04W 4/00* (2009.01)
*H04W 72/08* (2009.01)

(52) U.S. Cl.
CPC ........ *H04W 36/0072* (2013.01); *H04W 72/085* (2013.01)

(58) Field of Classification Search
USPC ........................... 455/436, 425; 370/331, 357
See application file for complete search history.

(56) References Cited

U.S. PATENT DOCUMENTS

| | | | |
|---|---|---|---|
| 7,944,888 B2 * | 5/2011 | Venkitaraman | 370/331 |
| 2009/0247150 A1 * | 10/2009 | Fischer et al. | 455/425 |
| 2009/0253434 A1 * | 10/2009 | Hayashi et al. | 455/436 |
| 2010/0322185 A1 * | 12/2010 | Park et al. | 370/331 |

FOREIGN PATENT DOCUMENTS

CN       101203034 A    6/2008

OTHER PUBLICATIONS

3GPP TSG RAN WG2 #67 R2-094966 Aug. 2009.*
3GPP TSG RAN WG2 #67 R2-094731 Aug. 2009.*
3GPP TSG RAN WG2 #66 R2-093722 Jul. 2009.*
U.S. Appl. No. 13/579,398, filed Aug. 16, 2012, Takano.

(Continued)

*Primary Examiner* — William Nealon
(74) *Attorney, Agent, or Firm* — Oblon, McClelland, Maier & Neustadt, L.L.P.

(57) ABSTRACT

Provided is a method for performing a handover from a first base station to a second base station by a user equipment that is performing a radio communication over a communication channel formed by aggregating a plurality of component carriers. The method includes a step of transmitting a handover command for a component carrier for which a handover has been approved by the second base station among the plurality of component carriers from the first base station to the user equipment and a step of trying to make an access from the user equipment to the second base station for each component carrier in response to the handover command.

12 Claims, 15 Drawing Sheets

(56) References Cited

OTHER PUBLICATIONS

3GPP TSG RAN WG2 Meeting #66bis R2-093722, "Handover for Carrier Aggregation," CATT. Total 3 Pages, (Jun. 29-Jul. 3, 2009).

3GPP TSG-RAN2 Meeting #67 R2-094966, "Measurement configuration structure for carrier aggregation," LG Electronics Inc., Total 4 Pages, (Aug. 24-28, 2009).

3GPP TSG RAN WG2 Meeting #67 R2-094731, "Intra LTE-A UE Handover Procedure inter-eNB for CA," Huawei, Total 5 Pages, (Aug. 24-28, 2009).

International Search Report Issued Aug. 31, 2010 in PCT/JP10/63180 Filed Aug. 4, 2010.

Office Action issued on Feb. 26, 2014 in Chinese Patent Application No. 201080047396.5 and its English translation.

* cited by examiner

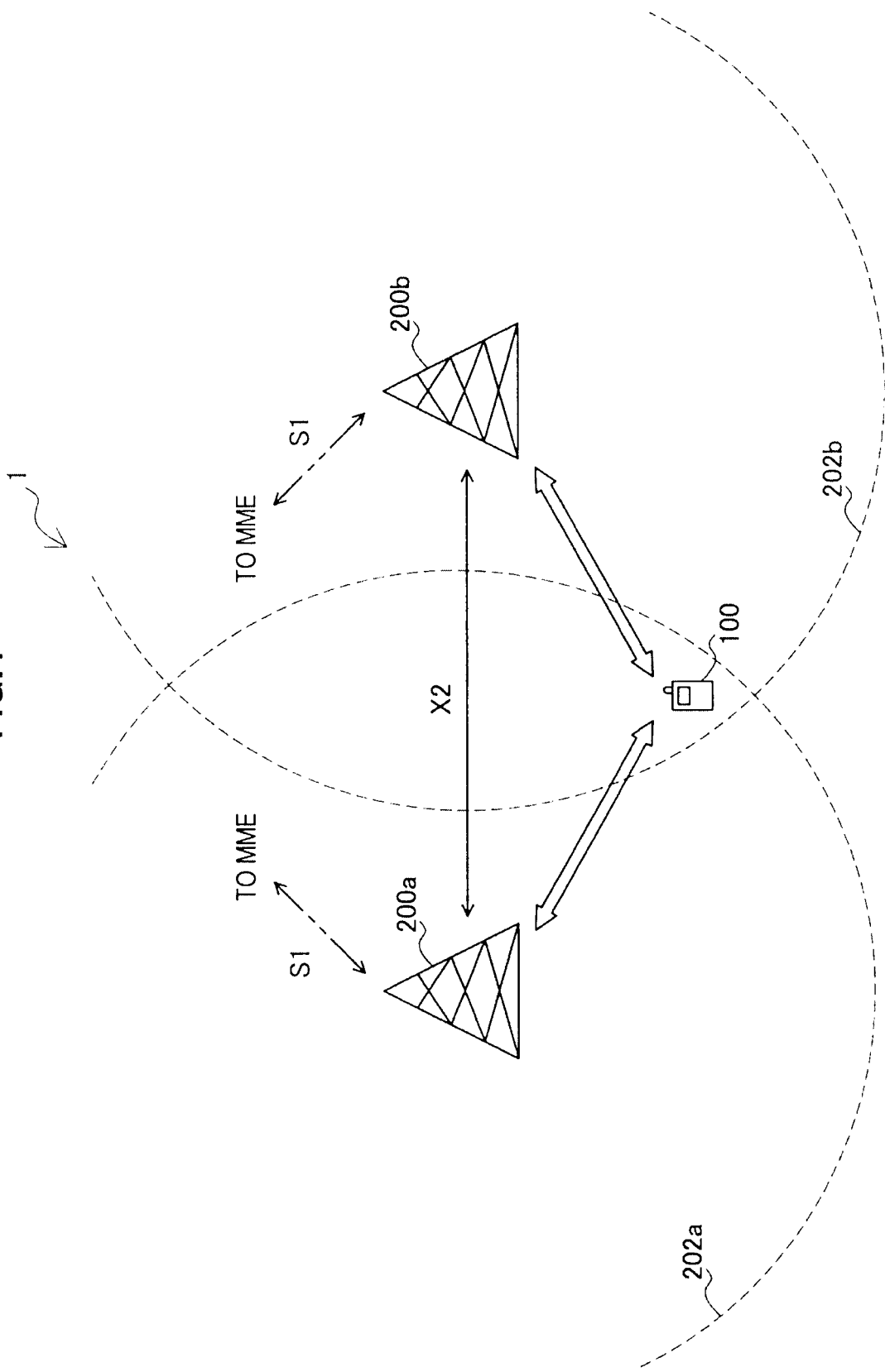

METHOD FOR PERFORMING HANDOVER, USER EQUIPMENT, BASE STATION, AND RADIO COMMUNICATION SYSTEM

TECHNICAL FIELD

The present invention relates to a method for performing a handover, a user equipment, a base station, and a radio communication system.

BACKGROUND ART

In Long Term Evolution-Advanced (LTE-A), which is the next-generation cellular communication standard that is discussed in Third Generation Partnership Project (3GPP), introduction of technology called carrier aggregation (CA) has been studied. The carrier aggregation is technology that forms a communication channel between a user equipment (UE) and a base station (BS, or evolved Node B (eNB)) by aggregating a plurality of frequency bands that are supported in LTE, for example, and thereby improves communication throughput. Each frequency band included in one communication channel by the carrier aggregation is called a component carrier (CC). The bandwidths of frequency bands that are available in LTE are 1.4 MHz, 3.0 MHz, 5.0 MHz, 10 MHz, 15 MHz, and 20 MHz. Accordingly, if five bands of 20 MHz are aggregated as component carriers, a communication channel of 100 MHz in total can be formed.

Component carriers that are included in one communication channel in the carrier aggregation are not necessarily contiguous to one another in the frequency direction. The mode in which component carriers are arranged contiguous to one another in the frequency direction is called a contiguous mode. On the other hand, the mode in which component carriers are arranged not contiguous to one another is called a non-contiguous mode.

Further, in the carrier aggregation, the number of component carriers in an uplink and the number of component carriers in a downlink are not necessarily equal. The mode in which the number of component carriers in an uplink and the number of component carriers in a downlink are equal is called a symmetric mode. On the other hand, the mode in which the number of component carriers in an uplink and the number of component carriers in a downlink are not equal is called an asymmetric mode. For example, in the case of using two component carriers in an uplink and three component carriers in a downlink, it is asymmetric carrier aggregation.

Further, in LTE, any one of frequency division duplex (FDD) and time division duplex (TDD) can be used as duplex operation. Because the direction of a link (uplink or downlink) of each component carrier does not change in time in FDD, FDD is better suited to the carrier aggregation compared to TDD.

A handover, which is a basic technique for achieving the mobility of a user equipment in the cellular communication standard, is one of important subjects in LTE-A. In LTE, a user equipment measures a communication quality over a channel with a serving base station (a currently connected base station) and communication qualities with peripheral base stations and transmits a measurement report containing measurements to the serving base station. Receiving the measurement report, the serving base station determines whether to execute a handover based on the measurements contained in the report. Then, if it is determined that a handover is to be executed, a handover is carried out among a source base station (the serving base station before a handover), the user equipment, and a target base station (a serving base station after a handover) in accordance with a prescribed procedure (e.g. cf. Patent Literature 1 below).

CITATION LIST

Patent Literature

Patent Literature 1: JP 2009-232293A

SUMMARY OF INVENTION

Technical Problem

However, no case has been reported where active consideration is given to how to carry out a handover procedure in a radio communication involving the carrier aggregation.

For example, even when a handover is executed on a communication channel configured with a plurality of component carriers, the target base station cannot necessarily secure component carriers which are equal in number to those of the source base station. In this case, a problem may occur in communication due to a handover delay if a handover is not approved by the target base station by the time component carriers which are equal in number to those of the source base station are secured. On the other hand, if a handover procedure can be carried out for each component carrier, a handover can be completed early on a number of component carriers which can be secured in the target base station.

In this regard, the present invention provides a method for performing a handover, a user equipment, a base station, and a radio communication system, which are novel and improved and are capable of carrying out a handover procedure for each component carrier in radio communication involving carrier aggregation.

Solution to Problem

According to an aspect of the present invention, there is provided a method for performing a handover from a first base station to a second base station by a user equipment that is performing radio communication over a communication channel formed by aggregating a plurality of component carriers. The method includes a step of transmitting a handover command for a component carrier for which a handover has been approved by the second base station among the plurality of component carriers from the first base station to the user equipment and a step of trying to make an access from the user equipment to the second base station for each component carrier in response to the handover command.

Further, the method may further include a step of transmitting one measurement report for all of the plurality of component carriers from the user equipment to the first base station.

Further, the method may further include a step of transmitting one measurement report for each of the plurality of component carriers from the user equipment to the first base station.

Further, the method may further include a step of transmitting one handover request for all of the plurality of component carriers from the first base station to the second base station, and the handover request may include information representing the number of component carriers which are to be included in a new communication channel.

Further, the method may further include a step of transmitting one handover request for each of the plurality of component carriers from the first base station to the second base station.

Further, the method may further include a step of performing notification of the number of component carriers for which a handover has been approved among the plurality of component carriers from the second base station to the first base station.

Further, the handover request may include information related to an arrangement of component carriers which are to configure a communication channel between the user equipment and the second base station after a handover.

Further, the method may further include a step of transmitting an extended handover command for instructing a handover for a component carrier for which a handover is not completed among the plurality of component carriers via a communication channel formed in response to the command from the second base station to the user equipment.

Further, according to another aspect of the present invention, there is provided a user equipment including a radio communication unit that performs radio communication with a base station over a communication channel formed by aggregating a plurality of component carriers and a control unit that controls a handover of the radio communication unit from a first base station to a second base station, wherein the control unit receives a handover command for a component carrier for which a handover has been approved by the second base station among the plurality of component carriers from the first base station through the radio communication unit and then causes the radio communication unit to try to make an access to the second base station for each component carrier in response to the handover command.

Further, according to another aspect of the present invention, there is provided a base station including a radio communication unit that performs a radio communication with a user equipment over a communication channel formed by aggregating a plurality of component carriers and a control unit that controls a handover by the user equipment, wherein the control unit decides execution of a handover to another base station by the user equipment and then transmits a handover command for a component carrier for which a handover has been approved by another base station among the plurality of component carriers to the user equipment through the radio communication unit.

Further, according to another aspect of the present invention, there is provided a radio communication system including a user equipment that performs radio communication over a communication channel formed by aggregating a plurality of component carriers, a first base station that provides the user equipment with a communication service over the communication channel, and a second base station that is a target of a handover from the first base station by the user equipment, wherein the first base station decides execution of a handover from the first base station to the second base station by the user equipment and then transmits a handover command for a component carrier for which a handover has been approved by the second base station among the plurality of component carriers to the user equipment, and the user equipment tries to make an access to the second base station for each component carrier in response to the handover command.

Advantageous Effects of Invention

As described above, according to a method for performing a handover, a user equipment, a base station, and a radio communication system according to the present invention, it is possible to carry out a handover procedure for each component carrier in a radio communication involving the carrier aggregation.

BRIEF DESCRIPTION OF DRAWINGS

FIG. 4 is a schematic view showing an outline of a radio communication system according to an embodiment.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Preferred embodiments of the present invention will be described hereinafter in the following order.

1. Description of Related Art
   1-1. Handover Procedure
   1-2. Structure of Communication Resource
   1-3. Description of Problem
   2. Outline of Radio Communication System
   3. Configuration of Device according to Embodiment
   3-1. Exemplary Configuration of User Equipment
   3-2. Exemplary Configuration of Base Station
   4. Flow of Process
   4-1. First Scenario
   4-2. Second Scenario 4-3. Third Scenario
4-4. Fourth Scenario
4-5. Exemplary Configuration of Message
5. Summary <1. Description of Related Art>

(1-1. Handover Procedure)

Figure 1:
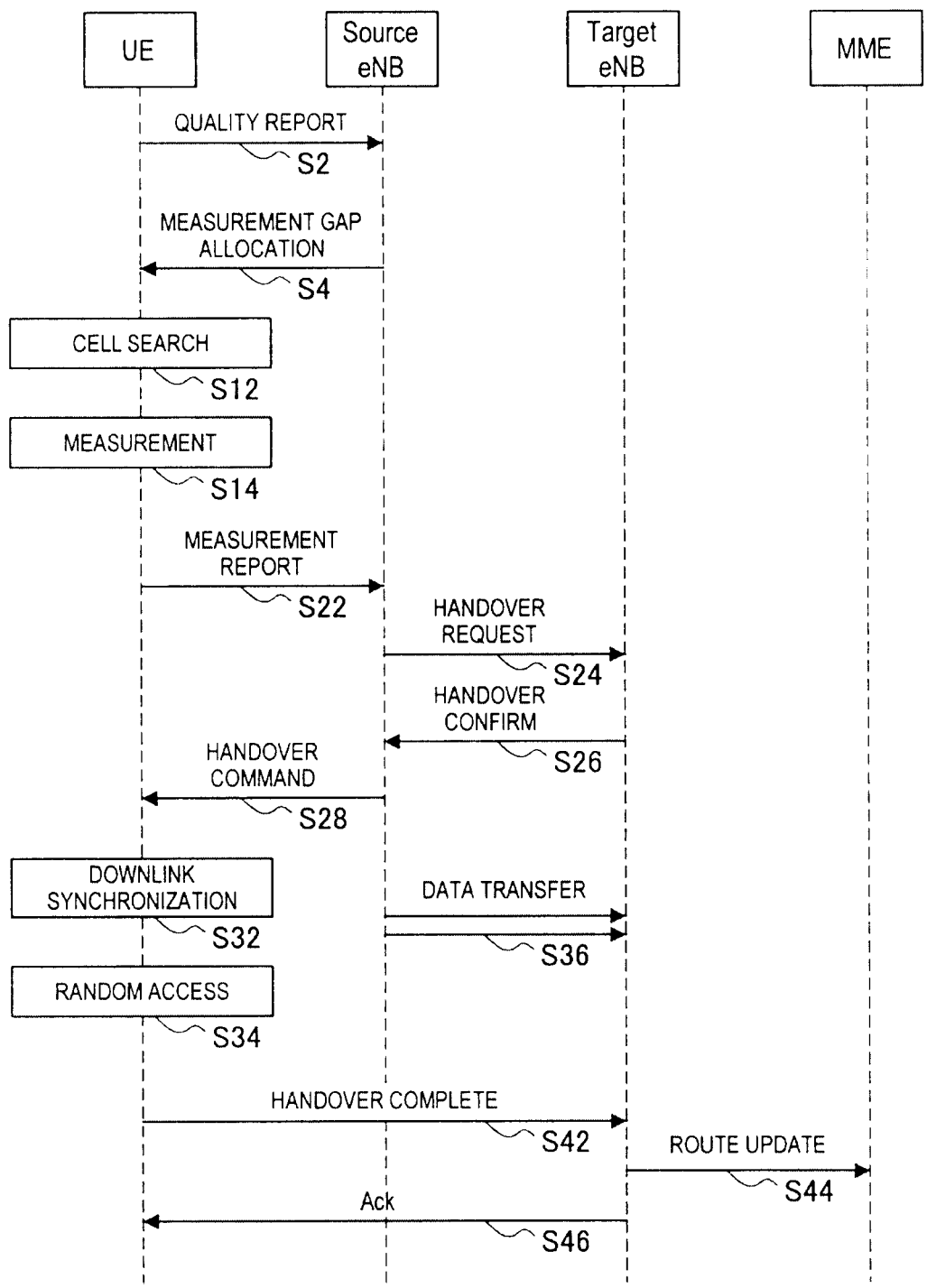
FIG. 1 is a sequence chart to describe a flow of a typical handover procedure.

A technique related to the present invention is described hereinafter with reference to FIGS. 1 and 2. FIG. 1 shows a flow of a handover procedure in conformity with LTE in a radio communication not involving the carrier aggregation as an example of a typical handover procedure. In this example, a user equipment (UE), a source base station (source eNB), a target base station (target eNB), and a mobility management entity (MME) are involved in the handover procedure.

As a preliminary step toward a handover, the user equipment first reports the channel quality of a communication channel between the user equipment and the source base station to the source base station (step S2). The channel quality may be reported on a regular basis or when the channel quality falls below a predetermined reference value. The user equipment can measure the channel quality of the communication channel with the source base station by receiving a reference signal contained in a downlink channel from the source base station.

Then, the source base station determines the needs of measurement based on the quality report received from the user equipment and, if measurement is necessary, allocates measurement gaps to the user equipment (step S4).

Then, the user equipment searches for a downlink channel from a peripheral base station (i.e. performs cell search) during the periods of the allocated measurement gaps (step S12). Note that the user equipment can recognize a peripheral base station to search according to a list that is provided in advance from the source base station.

When the user equipment acquires synchronization with a downlink channel, the user equipment performs measurement by using a reference signal contained in the downlink channel (step S14). During this period, the source base station restricts an allocation of data communication related to the user equipment so as to avoid occurrence of data transmission by the user equipment.

Upon completion of the measurement, the user equipment transmits a measurement report containing measurements to the source base station (step S22). The measurements contained in the measurement report may be the average value or the central value of measured values over a plurality of times of measurement or the like. Further, the measurements may contain data about a plurality of frequency bands.

Receiving the measurement report, the source base station determines whether or not to execute a handover based on the contents of the measurement report. For example, when the channel quality of another base station in the periphery is higher than the channel quality of the source base station by a predetermined threshold or greater, it can be determined that a handover is necessary. In this case, the source base station determines to carry out a handover procedure with the relevant another base station as a target base station, and transmits a handover request message to the target base station (step S24).

Receiving the handover request message, the target base station determines whether it is possible to accept the user equipment according to the availability of a communication service offered by itself or the like. When it is possible to accept the user equipment, the target base station transmits a handover request confirm message to the source base station (step S26).

Receiving the handover request confirm message, the source base station transmits a handover command to the user equipment (step S28). Then, the user equipment acquires synchronization with the downlink channel of the target base station (step S32). After that, the user equipment makes a random access to the target base station by using a random access channel in a given time slot (step S34). During this period, the source base station forwards data addressed to the user equipment to the target base station (step S36). Then, after success in the random access, the user equipment transmits a handover complete message to the target base station (step S42).

Receiving the handover complete message, the target base station requests the MME to perform route update for the user equipment (step S44). Upon updating the route of user data by the MME, the user equipment becomes able to communicate with another device through a new base station (i.e. the target base station). Then, the target base station transmits acknowledgement to the user equipment (step S46). A series of handover procedure thereby ends.

(1-2. Structure of Communication Resource)

Figure 2:
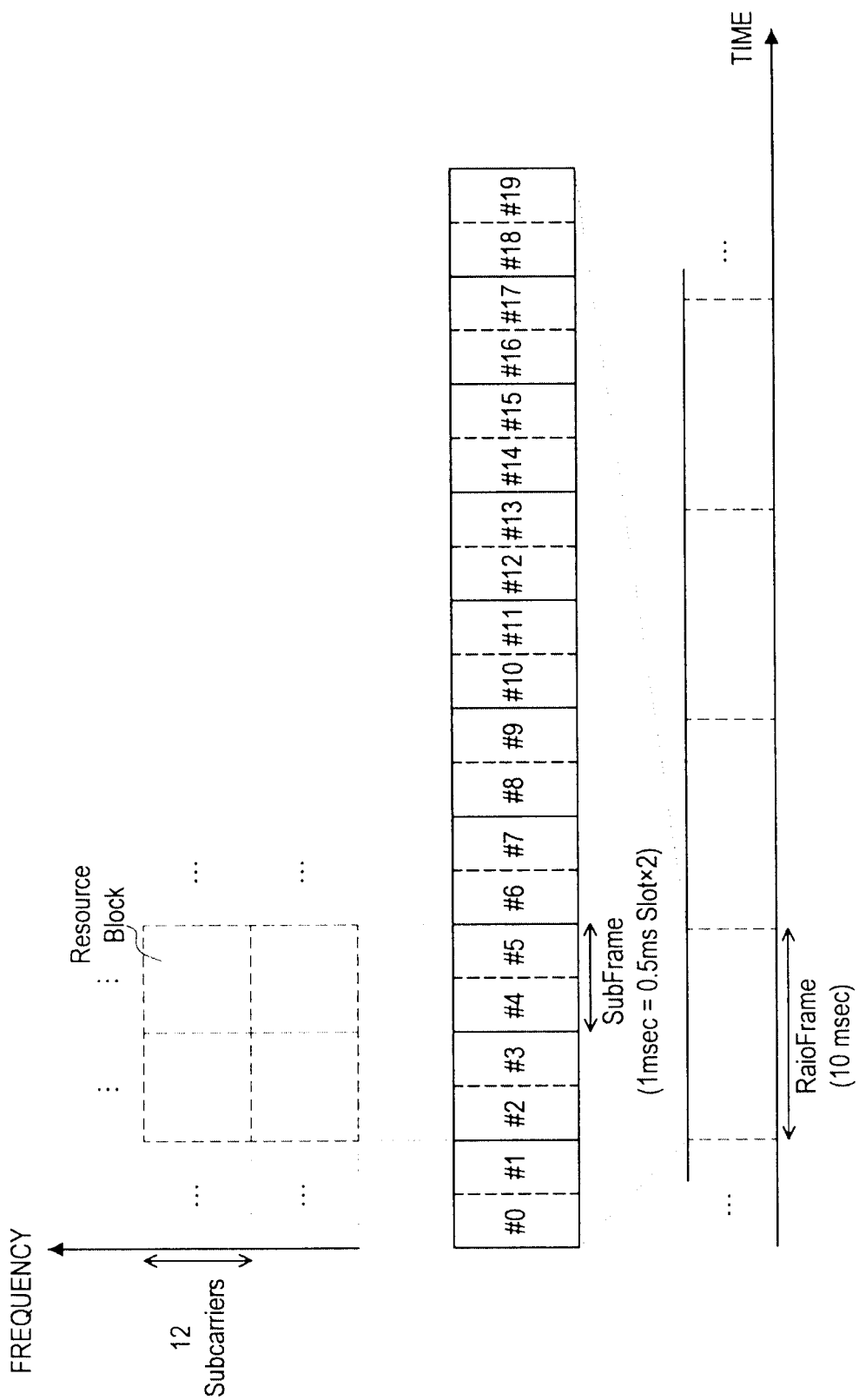
FIG. 2 is an explanatory view to describe an example of a structure of a communication resource.

FIG. 2 shows a structure of a communication resource in LTE as an example of a structure of a communication resource to which the present invention is applicable. Referring to FIG. 2, the communication resource in LTE is segmented in the time direction into radio frames each having a length of 10 msec. One radio frame includes ten sub-frames, and one sub-frame is made up of two 0.5 msec slots. In LTE, the sub-frame is one unit of an allocation of a communication resource to each user equipment in the time direction. Such one unit is called a resource block. One resource block includes twelve sub-carriers in the frequency direction. Specifically, one resource block has a size of 1 msec with 12 sub-carriers in the time-frequency domain. Throughput of data communication increases as a larger number of resource blocks are allocated for data communication on condition of the same bandwidth and time length. Further, in such a structure of a communication resource, a part of radio frame with a given frequency band is reserved as a random access channel. The random access channel can be used for an access to a base station by a user equipment that has changed from an idle mode to an active mode or an initial access to a target base station in a handover procedure, for example.

[1-3. Description of Problem]

Next, a problem of a handover procedure in radio communication involving carrier aggregation as an example of a typical handover procedure will be described with reference to FIGS. 3A to 3C.

Figure 3A:
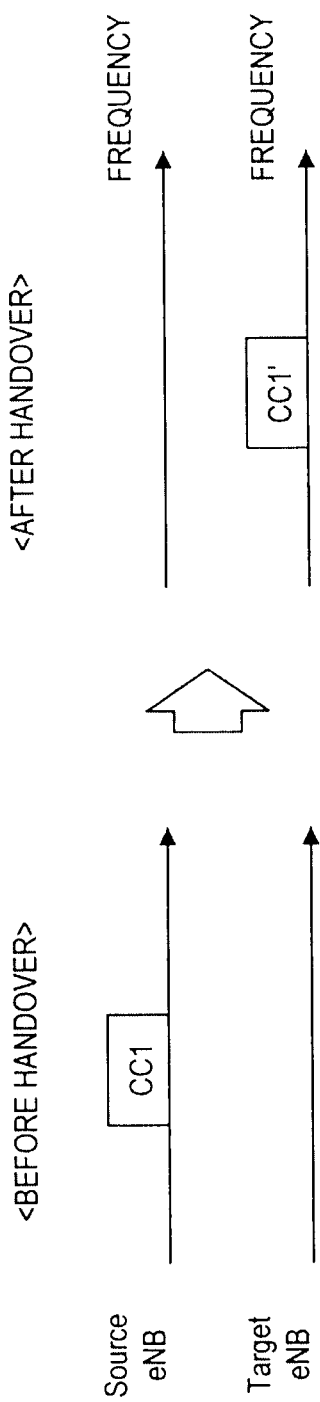
FIG. 3A is an explanatory view to describe a handover in conventional radio communication.

First, FIG. 3A is an explanatory view to describe a handover in conventional radio communication. Referring to FIG. 3A, a frequency band CC1 that has been used in a source base station (source eNB) before a handover is moved to frequency band CC1' of a target base station (target eNB) after a handover. In this case, the handover may be performed, for example, according to the procedure described with reference to FIG. 1. The position of the frequency band on the frequency axis before the handover may be different from the position of the frequency band on the frequency axis after the handover.

Figure 3B:
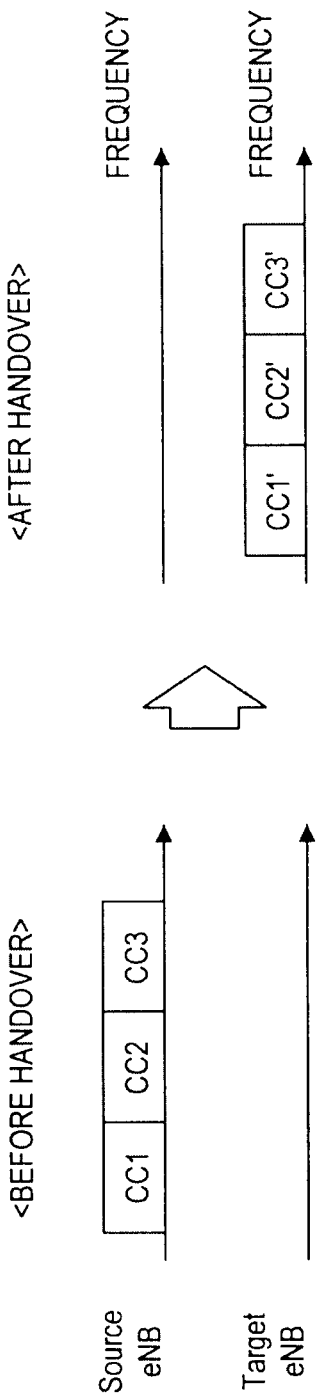
FIG. 3B is an explanatory view to describe a general handover in radio communication involving a carrier aggregation.

FIG. 3B is an explanatory view to describe a general handover in radio communication involving the carrier aggregation. Referring to FIG. 3B, component carriers CC1 to CC3 which have been used in the source base station before the handover are moved to component carriers CC1' to CC3' of the target base station after the handover. In this case, the handover may be performed, for example, according to the procedure described with reference to FIG. 1. However, in this case, when the handover becomes necessary, the target base station cannot necessarily secure a number of component carriers (3 components carriers in the example of FIG. 3B) which are equal in number to those in the source base station. For this reason, the target base station does not transmit the handover request confirm message until a number of component carriers which are equal in number to those in the source base station can be secured, so that the handover is delayed. Further, it is difficult to change only an access destination of a specific component carrier to another station.

Figure 3C:
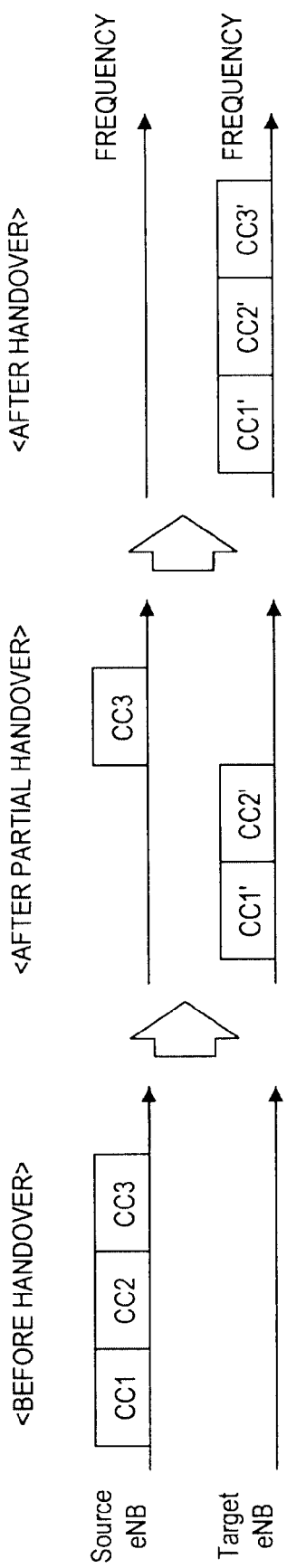
FIG. 3C is an explanatory view to describe an exemplary handover according to an embodiment of the present invention in radio communication involving a carrier aggregation.

FIG. 3C is an explanatory view to describe an exemplary handover in radio communication involving the carrier aggregation, which is implemented according to an embodiment of the present invention which will be described later. Referring to FIG. 3C, the handover is executed in a stepwise manner. In other word, the component carriers CC1 and CC2 among the component carriers CC1 to CC2 which have been used in the source base station before the handover are moved to the component carriers CC1' and CC2' of the target base station. Thereafter, the remaining component carrier CC3 is moved to the component carrier CC3' of the target base station. The handover procedure of the component carrier is not limited to this example and may be any other procedure. As described above, when the handover procedure is performed for each component carrier, the handover can be completed early for a number of component carriers which can be secured in the target base station. As a result, a problem occurring in communication due to the handover delay is avoided. Further, in order to prevent the deterioration in the communication quality for component carriers which is caused by frequency selective fading, only an access destination of a specific component carrier can be changed to another base station. An embodiment of the present invention in which the handover procedure is carried out for each component carrier in radio communication involving carrier aggregation will be concretely described in the next section.

<2. Outline of Radio Communication System>

FIG. 4 is a schematic view showing an outline of a radio communication system 1 according to an embodiment of the present invention. Referring to FIG. 4, the radio communication system 1 includes a user equipment 100, a base station 200a and a base station 200b. It is assumed that the base station 200a is a serving base station for the user equipment 100.

The user equipment 100 is located inside a cell 202a where a radio communication service is provided by the base station 200a. The user equipment 100 can perform a data communication with another user equipment (not shown) via the base station 200a over a communication channel formed by aggregating a plurality of component carriers (i.e. by carrier aggregation). However, because the distance between the user equipment 100 and the base station 200a is not short, there is a possibility that a handover is required for the user equipment 100. Further, the user equipment 100 is located inside a cell 202b where a radio communication service is provided by the base station 200b. Therefore, the base station 200b can be a candidate for a target base station for a handover of the user equipment 100.

The base station 200a can communicate with the base station 200b through a backhaul link (e.g. X2 interface). Various kinds of messages in the handover procedure as described with reference to FIG. 1, scheduling information related to the user equipment belonging to each cell or the like, for example, can be transmitted and received between the base station 200a and the base station 200b. Further, the base station 200a and the base station 200b can communicate with the MME, which is an upper node, through S1 interface, for example.

It should be noted that, when there is no particular need to distinguish between the base station 200a and the base station 200b in the following description of the specification, they are collectively referred to as a base station 200 by omitting the alphabetical letter at the end of the reference symbol. The same applies to the other elements.

<3. Configuration of Device according to Embodiment>

Hereinafter, exemplary configurations of the user equipment 100 and the base station 200 included in the radio communication system 1 according to an embodiment of the present invention will be described with reference to FIGS. 5 to 7.

(3-1. Exemplary Configuration of User Equipment)

Figure 5:
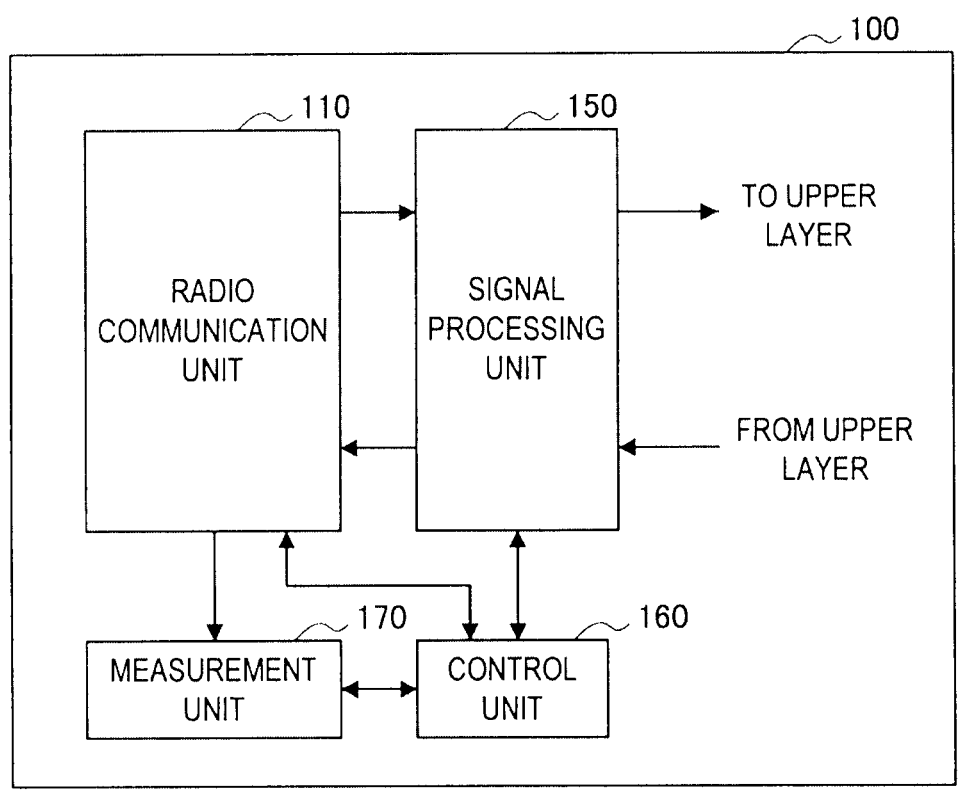
FIG. 5 is a block diagram showing an example of a configuration of a user equipment according to an embodiment.

FIG. 5 is a block diagram showing an example of a configuration of the user equipment 100 according to the embodiment. Referring to FIG. 5, the user equipment 100 includes a radio communication unit 110, a signal processing unit 150, a control unit 160, and a measurement unit 170.

(Radio Communication Unit)

The radio communication unit 110 performs a radio communication with the base station 200 over a communication channel formed by aggregating a plurality of component carriers with use of the carrier aggregation technology.

Figure 6:
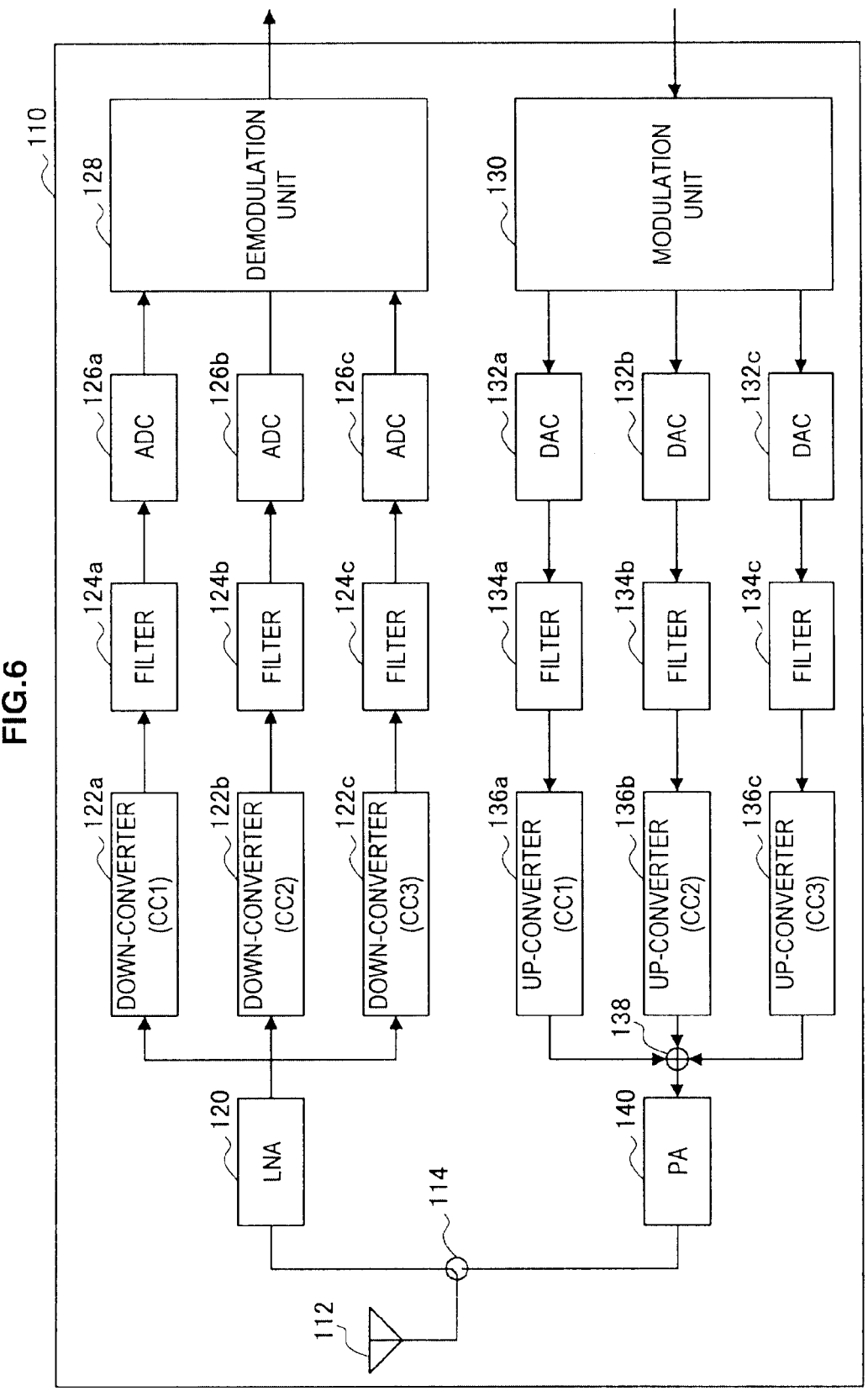
FIG. 6 is a block diagram showing an example of a detailed configuration of a radio communication unit according to an embodiment.

FIG. 6 is a block diagram showing an example of a more detailed configuration of the radio communication unit 110. Referring to FIG. 6, the radio communication unit 110 includes an antenna 112, a switch 114, a low noise amplifier (LNA) 120, a plurality of down-converters 122a to 122c, a plurality of filters 124a to 124c, a plurality of analogue-to-digital converters (ADCs) 126a to 126c, a demodulation unit 128, a modulation unit 130, a plurality of digital-to-analogue converters (DACs) 132a to 132c, a plurality of filters 134a to 134c, a plurality of up-converters 136a to 136c, a combiner 138, and a power amplifier (PA) 140.

The antenna 112 receives a radio signal transmitted from the base station 200 and outputs the received signal to the LNA 120 through the switch 114. The LNA 120 amplifies the received signal. The down-converter 122a and the filter 124a separate a baseband signal of the first component carrier (CC1) from the received signal amplified by the LNA 120. Then, the separated baseband signal is converted to a digital signal by the ADC 126a and output to the demodulation unit 128. Likewise, the down-converter 122b and the filter 124b separate a baseband signal of the second component carrier (CC2) from the received signal amplified by the LNA 120. Then, the separated baseband signal is converted to a digital signal by the ADC 126b and output to the demodulation unit 128. Further, the down-converter 122c and the filter 124c separate a baseband signal of the third component carrier (CC3) from the received signal amplified by the LNA 120. Then, the separated baseband signal is converted to a digital signal by the ADC 126c and output to the demodulation unit 128. After that, the demodulation unit 128 generates a data signal by demodulating the baseband signals of the respective component carriers and outputs the data signal to the signal processing unit 150.

Further, when a data signal is input from the signal processing unit 150, the modulation unit 130 modulates the data signal and generates baseband signals of the respective component carriers. Among those baseband signals, the baseband signal of the first component carrier (CC1) is converted to an analog signal by the DAC 132a. Then, a frequency component corresponding to the first component carrier in a transmission signal is generated from the analog signal by the filter 134a and the up-converter 136a. Likewise, the baseband signal of the second component carrier (CC2) is converted to an analog signal by the DAC 132b. Then, a frequency component corresponding to the second component carrier in the transmission signal is generated from the analog signal by the filter 134b and the up-converter 136b. Further, the baseband signal of the third component carrier (CC3) is converted to an analog signal by the DAC 132c. Then, a frequency component corresponding to the third component carrier in the transmission signal is generated from the analog signal by the filter 134c and the up-converter 136c. After that, the generated frequency components corresponding to the three component carriers are combined by the combiner 138, and the transmission signal is formed. The PA 140 amplifies the transmission signal and outputs the transmission signal to the antenna 112 through the switch 114. Then, the antenna 112 transmits the transmission signal as a radio signal to the base station 200.

Although the case where the radio communication unit 110 handles three component carriers is described in FIG. 6, the number of component carriers handled by the radio communication unit 110 may be two, or four or more.

Further, instead of processing the signals of the respective component carriers in the analog region as in the example of FIG. 6, the radio communication unit 110 may process the signals of the respective component carriers in the digital region. In the latter case, at the time of reception, a digital signal converted by one ADC is separated into the signals of the respective component carriers by a digital filter. Further, at the time of transmission, after digital signals of the respective component carriers are frequency-converted and combined, the signal is converted into an analog signal by one DAC. The load of the ADC and the DAC is generally smaller when processing the signals of the respective component carriers in the analog region. On the other hand, when processing the signals of the respective component carriers in the digital region, a sampling frequency for AD/DA conversion is higher, and the load of the ADC and the DAC can thereby increase.

(Signal Processing Unit)

Referring back to FIG. 5, an example of a configuration of the user equipment 100 is further described.

The signal processing unit 150 performs signal processing such as deinterleaving, decoding or error correction on the demodulated data signal that is input from the radio communication unit 110. Then, the signal processing unit 150 outputs the processed data signal to an upper layer. Further, the signal processing unit 150 performs signal processing such as encoding or interleaving on the data signal that is input from the upper layer. Then, the signal processing unit 150 outputs the processed data signals to the radio communication unit 110.

(Control Unit)

The control unit 160 controls the overall functions of the user equipment 100 by using a processing device such as a central processing unit (CPU) or a digital signal processor (DSP). For example, the control unit 160 controls the timing of data communication by the radio communication unit 110 according to scheduling information that is received from the base station 200 by the radio communication unit 110. Further, the control unit 160 causes the measurement unit 170 to measure the channel quality using the reference signal from the base station 200 which is the serving base station, and transmits the channel quality report to the base station 200 via the radio communication unit 110. The control unit 160 causes the measurement unit 170 to execute measurement during the period of the measurement gap allocated by the base station 200. Further, in the present embodiment, the control unit 160 implements the handover for each component carrier by carrying out the handover procedure between the user equipment 100 and the base station 200 according to any one of four scenarios which will be exemplarily described in the next section.

(Measurement Unit)

The measurement unit 170 measures the channel quality for each of the component carriers by using a reference signal from the base station 200 according to control from the control unit 160, for example. Further, the measurement unit 170 executes measurement for a handover with respect to each of the component carriers by using the measurement gaps which are allocated by the base station 200. A result of the measurement executed by the measurement unit 170 is converted to a predetermined format for a measurement report by the control unit 160 and transmitted to the base station 200 through the radio communication unit 110. After that, the base station 200 determines, based on the measurement report, whether a handover should be executed or not for the user equipment 100.

(3-2. Exemplary Configuration of Base Station)

Figure 7:
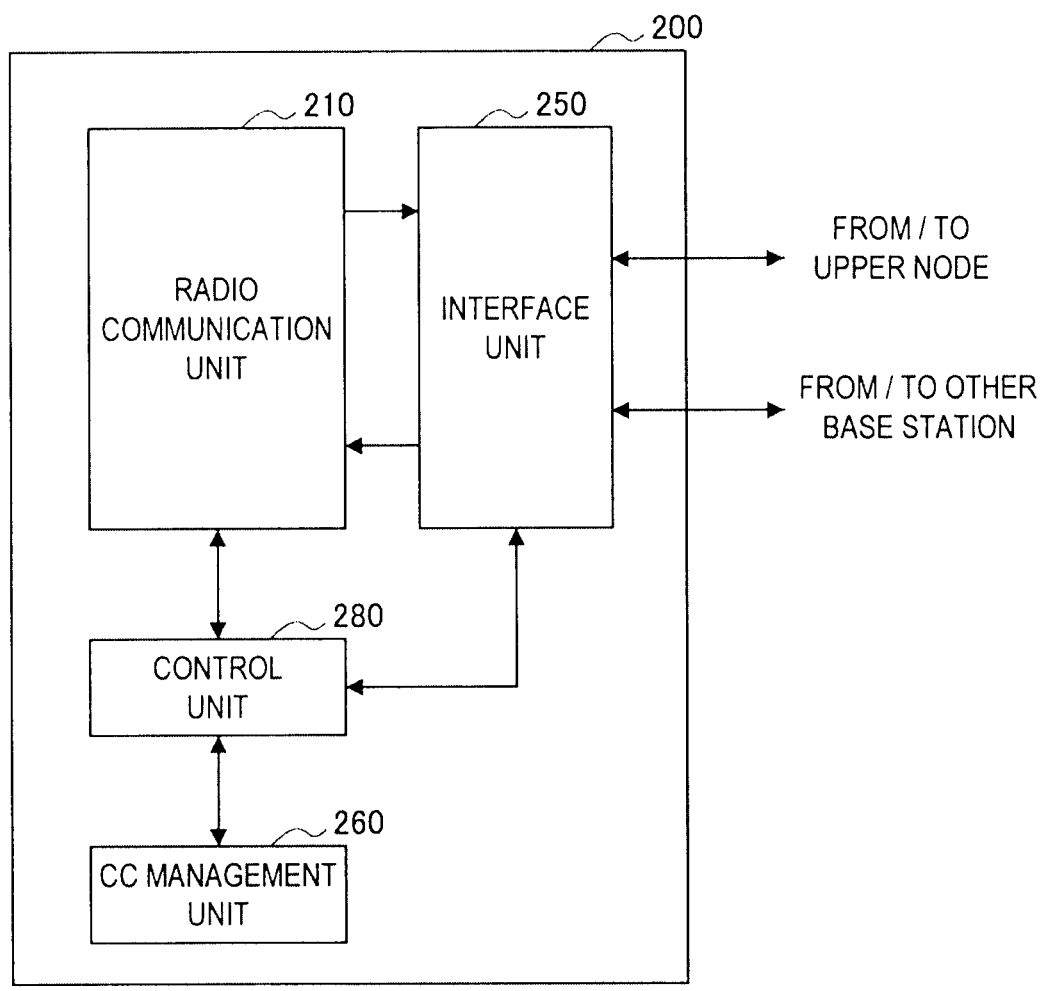
FIG. 7 is a block diagram showing an example of a configuration of a base station according to an embodiment.

FIG. 7 is a block diagram showing an example of a configuration of the base station 200 according to the embodiment. Referring to FIG. 7, the base station 200 includes a radio communication unit 210, an interface unit 250, a component carrier (CC) management unit 260, and a control unit 280.

(Radio Communication Unit)

A specific configuration of the radio communication unit 210 may be similar to the configuration of the radio communication unit 110 of the user equipment 100 which is described above with reference to FIG. 6, although the number of component carriers to be supported, the requirements of processing performance or the like are different. The radio communication unit 210 performs a radio communication with the user equipment over a communication channel which is formed by aggregating a plurality of component carriers with use of the carrier aggregation technology.

(Interface Unit)

The interface unit 250 mediates a communication between the radio communication unit 210 or the control unit 280 and an upper node through the S1 interface illustrated in FIG. 4, for example. Further, the interface unit 250 mediates a communication between the radio communication unit 210 or the control unit 280 and another base station through the X2 interface illustrated in FIG. 4, for example.

(CC Management Unit)

The CC management unit 260 holds data that indicates which component carrier each user equipment is using for communication with respect to each of the user equipments belonging to the cell of the base station 200. Such data can be updated by the control unit 280 when an additional user equipment joins the cell of the base station 200 or when an existing user equipment changes its component carriers. Thus, the control unit 280 can recognize which component carrier the user equipment 100 is using by referring to the data held by the CC management unit 260.

(Control Unit)

The control unit 280 controls the overall functions of the base station 200 using the processing device such as a CPU or a DSP. For example, in the present embodiment, the control unit 280 implements the handover for each component carrier by carrying out the handover procedure between the user equipment 100 and the base station 200 according to any one of four scenarios which will be exemplarily described in the next section.

<4. Flow of Process>

Hereinafter, handover procedures according to first to fourth scenarios of the present embodiment will be described with reference to FIGS. 8A to 11. It is assumed that the handover procedure among the user equipment 100, the base station 200a which is the source base station, and the base station 200b which is the target base station is carried through the first to fourth scenarios. Further, it is assumed that the user equipment 100 is performing radio communication using 3 component carriers before the handover procedure starts. The procedure (steps S2 to S14) until measurement is executed by the user equipment in the general handover procedure illustrated in FIG. 1 is not different, and a description thereof will be omitted.

[4-1. First Scenario]

Figure 8A:
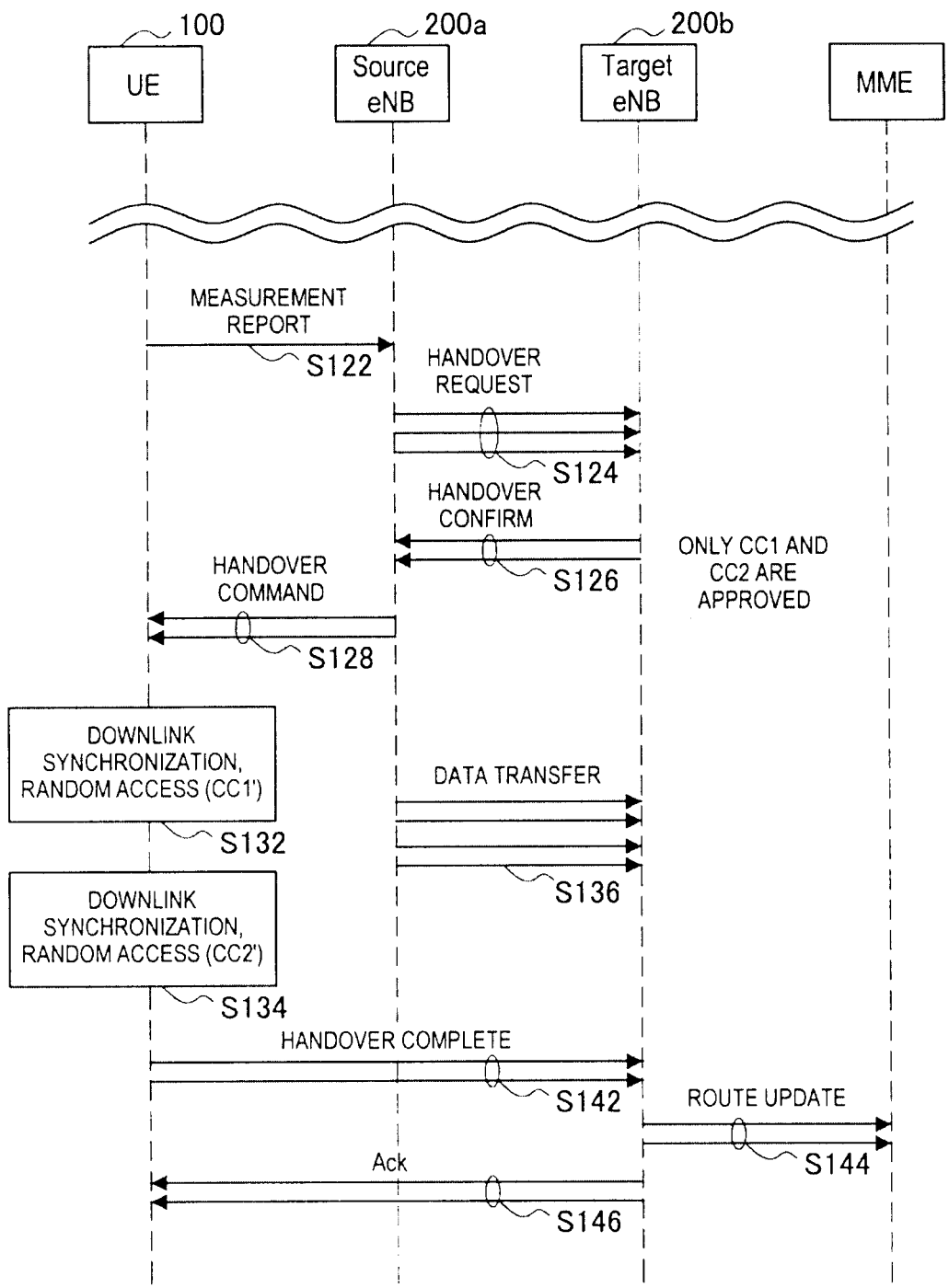
FIG. 8A is a first half portion of a sequence diagram illustrating an example of the flow of a handover procedure according to a first scenario.
Figure 8B:
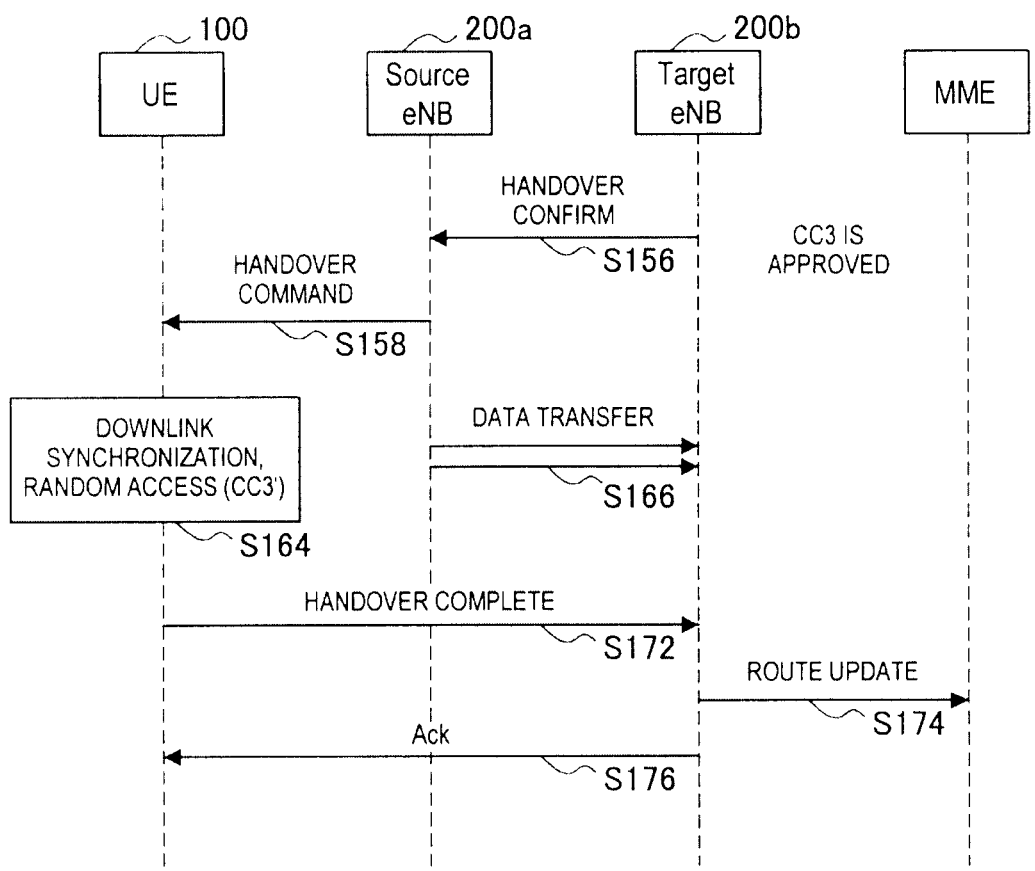
FIG. 8B is a second half portion of a sequence diagram illustrating an example of the flow of the handover procedure according to the first scenario.

FIGS. 8A and 8B are sequence diagrams illustrating an example of the flow of the handover procedure according to the first scenario of the present embodiment.

Referring to FIG. 8A, when measurement for each component carrier is completed, the user equipment 100 transmits one measurement report for all of a plurality of component carriers to the base station 200a (step S122). A measurement result included in the measurement report may be the average value or the central value of measured values over a plurality of times of measurement or the like. The measurement result may contain data about each of a plurality of component carriers or data aggregated over a plurality of component carriers.

The base station 200a that has received the measurement report determines whether a handover is to be executed for all communication channels or a handover is to be executed for each component carrier based on the measurement report. For example, when the channel quality between the user equipment 100 and the base station 200a is better than the channel quality between the user equipment 100 and the base station 200b by a predetermined threshold value or more, it is determined that the handover needs to be performed. In this case, the base station 200a decides to carry out the handover procedure in which the base station 200b is the target base station. Then, the base station 200a transmits one handover request message for each of a plurality of component carriers to the base station 200b (step S124). More specifically, for example, the control unit 280 that has determined that the handover needs to be performed checks the number of component carriers which are being used by the user equipment 100 with reference to data held in the CC management unit 260. Then, the control unit 280 transmits the handover request message of each component carrier to the base station 200b through the radio communication unit 210. In this scenario, since the user equipment 100 is using the 3 component carriers, three handover request messages are transmitted to the base station 200b.

The base station 200b that has received the three handover request messages determines the acceptable number of component carriers according to the availability of a communication service offered by itself or the like. Then, the base station 200b transmits a handover request confirm message to the base station 200a in response to each handover request message in a range not exceeding the acceptable number of component carriers (step S126). In this scenario, as an example, it is assumed that two component carriers (for example, component carriers CC1 and CC2) are acceptable in the base station 200b. Thus, 2 handover request confirm messages are transmitted from the base station 200b to the base station 200a.

The base station 200a that has received the handover request confirm message transmits a handover command for each of component carriers for which the handover has been approved to the user equipment 100 (step S128). In this scenario, 2 handover commands for two component carriers for which the handover has been approved by the base station 200b are transmitted from the base station 200a to the user equipment 100.

The user equipment 100 that has received the handover command first acquires synchronization with the downlink channel of the component carrier CC1' of the base station 200b. Then, the user equipment 100 makes a random access to the base station 200b using a random access channel set to a given time slot of the component carrier CC1' (step S132). Further, the user equipment 100 acquires synchronization with the downlink channel of the component carrier CC2' of the base station 200b. Then, the user equipment 100 makes a random access to the base station 200b using a random access channel set to a given time slot of the component carrier CC2' (step S134). At this time, the base station 200a transfers data on the component carrier CC1 and CC2 among data addressed to the user equipment 100 to the base station 200b (step S136). Then, when the random access is successfully made on each component carrier, the user equipment 100 transmits a handover complete message to the base station 200b (step S142).

The base station 200b that has received the handover complete message requests the MME to update the route for the user equipment 100 (step S144). Upon updating the route of user data by the MME, the user equipment 100 can communicate with another device through a new base station (i.e. the base station 200b). The route update request may be made for each component carrier or may be made once over a plurality of component carriers. Then, the base station 200b transmits an acknowledgement to the user equipment 100 in response to each received handover complete message (step S146).

Referring to FIG. 8B, thereafter, the base station 200b can determine that it can accept the handover on the remaining component carrier (for example, the component carrier CC3) according to the availability of a communication service. Thus, the base station 200b transmits the handover request confirm message for the corresponding component carrier to the base station 200a (step S156).

The base station 200a that has received the handover request confirm message transmits a handover command for the component carrier for which the handover has been approved to the user equipment 100 (step S158).

The user equipment 100 that has received the handover command acquires synchronization with the downlink channel of the component carrier CC3' of the base station 200b. Then, the user equipment 100 makes a random access to the base station 200b using a random access channel set to a given time slot of the component carrier CC3' (step S164). At this time, the base station 200a transfers data addressed to the user equipment 100 to the base station 200b (step S166). Then, when the random access is successfully made on the component carrier CC3', the user equipment 100 transmits a handover complete message to the base station 200b (step S172).

The base station 200b that has received the handover complete message requests the MME to update the route for the user equipment 100 when the route update request is made for each component carrier (step S174). Here, the route update request is used to update the route of the component carrier CC3 of the base station 200a to the route of the component carrier CC3' of the base station 200b. Then, the base station 200b transmits an acknowledgement to the user equipment 100 in response to the received handover complete message for the component carrier CC3 (step S176).

In this scenario, the handover command for the component carrier for which the handover has been approved by the base station 200b among a plurality of component carriers is transmitted from the base station 200a to the user equipment 100. Then, the user equipment 100 tries to make a random access to the base station 200b for each component carrier in response to the handover command. Thus, the handover procedure can be carried out for each component carrier.

Further, one measurement report for all of a plurality of component carriers is transmitted from the user equipment 100 to the base station 200a, and a plurality of handover requests corresponding to the number of component carriers are transmitted from the base station 200a to the base station 200b. Thus, since the user equipment 100 need not generate the measurement report for each component carrier, a change in the system of the existing LTE is suppressed to be small, and the new handover procedure can be easily introduced.

[4-2. Second Scenario]

Figure 9:
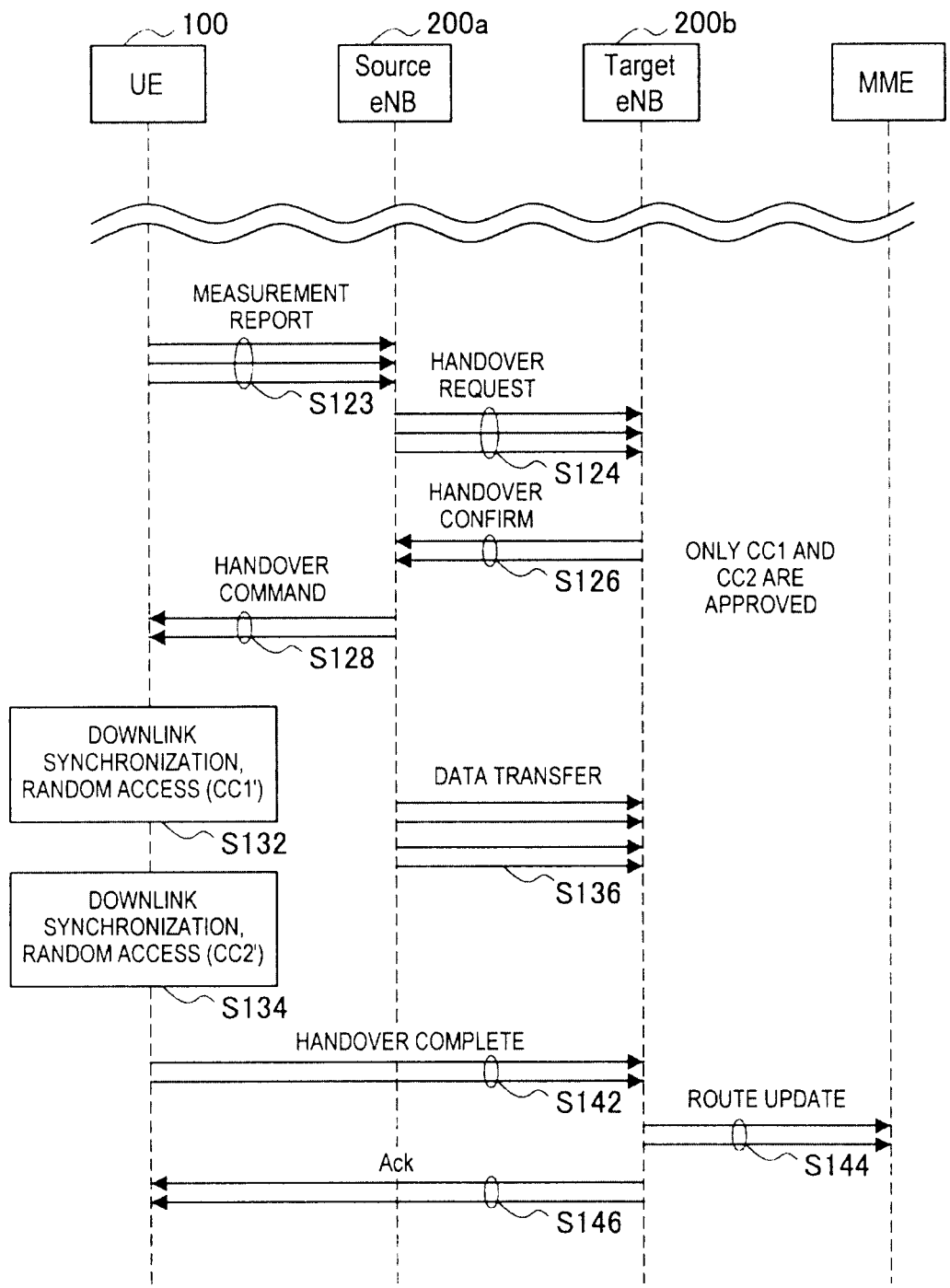
FIG. 9 is a first half portion of a sequence diagram illustrating an example of the flow of a handover procedure according to a second scenario.

FIG. 9 is a first half portion of a sequence diagram illustrating an example of the flow of the handover procedure according to the second scenario of the present embodiment.

Referring to FIG. 9, when measurement for each component carrier is completed, the user equipment 100 transmits one measurement report for each of a plurality of component carriers to the base station 200a (step S123). In this scenario, since 3 component carriers are being used by the user equipment 100, 3 measurement reports are transmitted to the base station 200a.

Next, the base station 200a determines whether or not a handover needs to be performed on each component carrier based on the content of the received measurement report. Then, the base station 200a transmits one handover request message for each of one or more component carriers for which it is determined that the handover procedure is to be executed to the base station 200b (step S124). In this scenario, a total of three handover request messages for 3 component carriers are transmitted from the base station 200a to the base station 200b. The subsequent handover procedure is the same as the procedure subsequent to step S126 according to the first scenario. Thus, in this scenario, a description of redundant steps will be omitted.

In this scenario, one measurement report for each of a plurality of component carriers is transmitted from the user equipment 100 to the base station 200a. Then, the base station 200a determines whether the handover is to be executed for all of communication channels or the handover is to be executed for each component carrier based on the received measurement report. Based on the determination result, the base station 200a transmits the handover request to the base station 200b for each component carrier. In this case, since the base station 200a need not generate a plurality of handover requests based on one measurement report, the impact on the base station 200a by introduction of the new handover procedure can be suppressed to be small.

[4-3. Third Scenario]

Figure 10A:
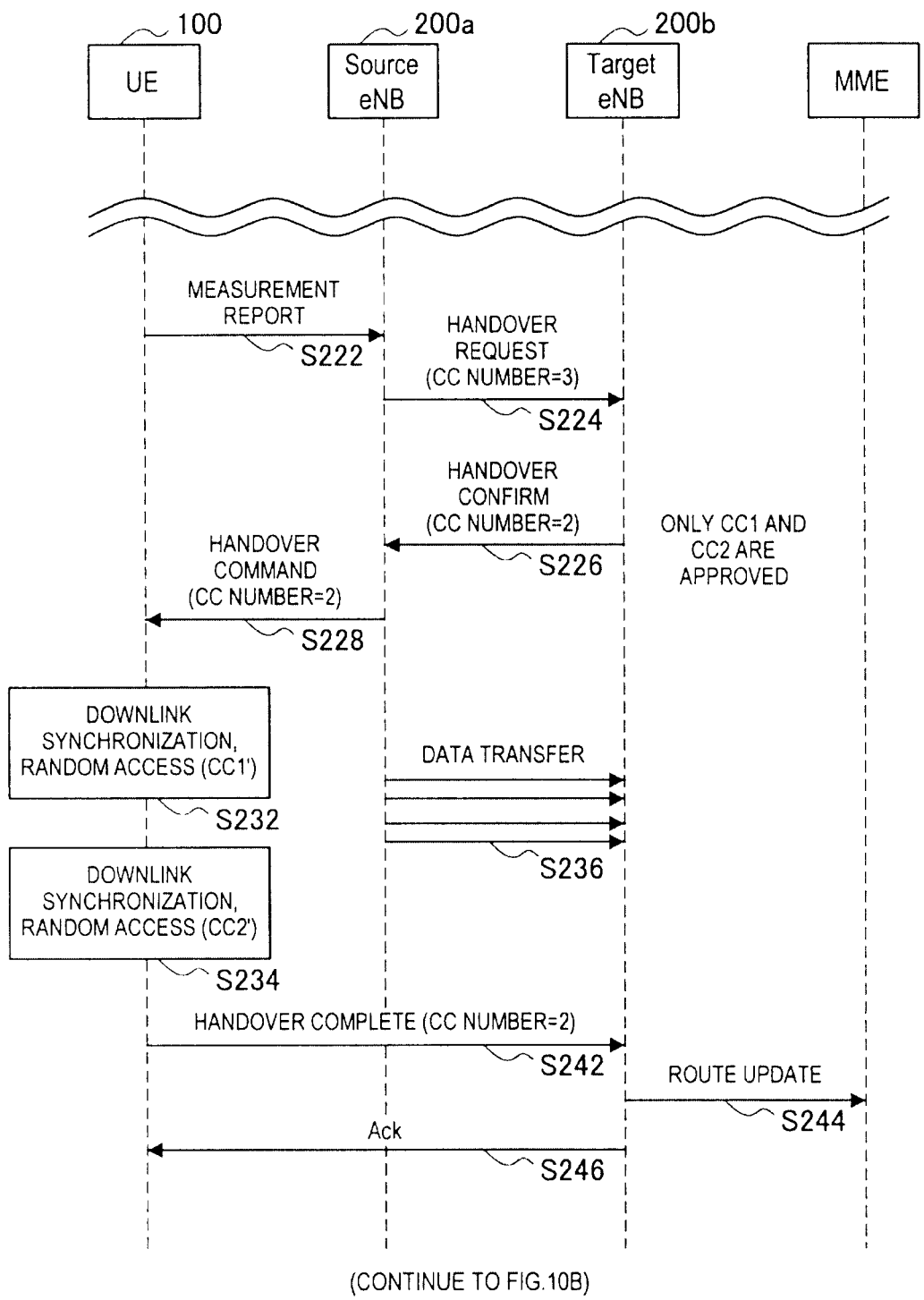
FIG. 10A is a first half portion of a sequence diagram illustrating an example of the flow of a handover procedure according to a third scenario.
Figure 10B:
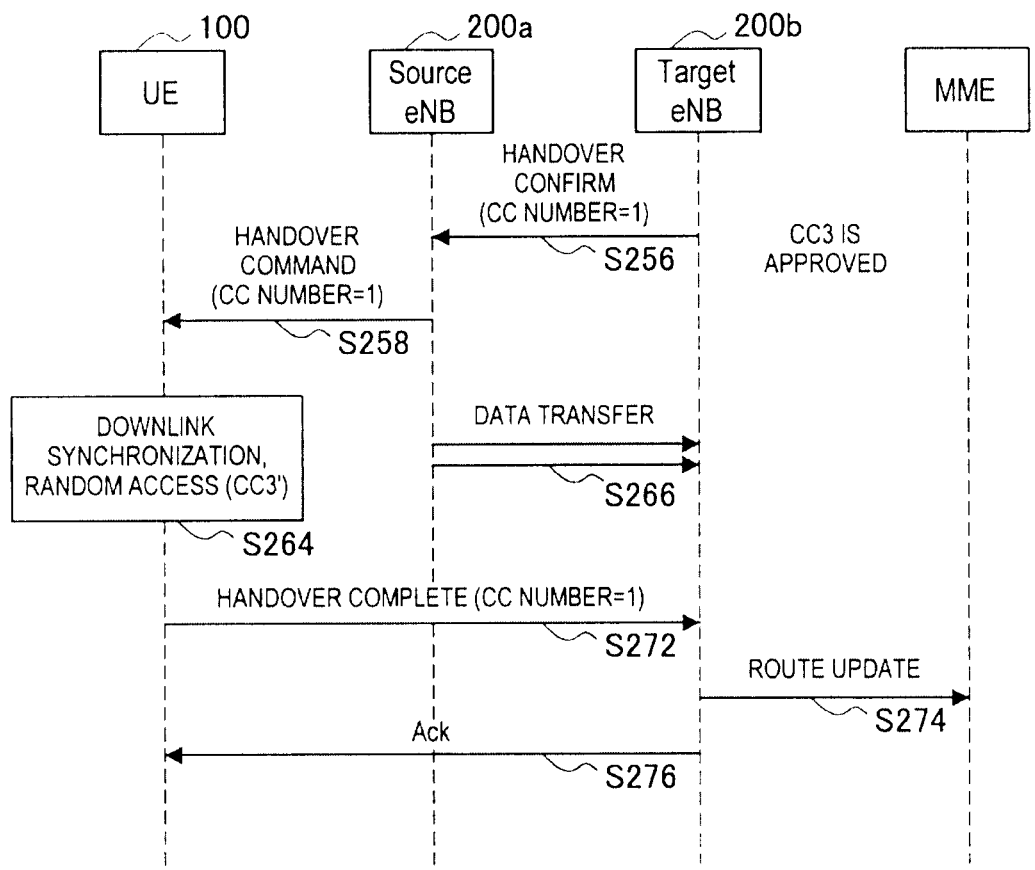
FIG. 10B is a second half portion of a sequence diagram illustrating an example of the flow of the handover procedure according to the third scenario.

FIGS. 10A and 10B are sequence diagrams illustrating an example of the flow of the handover procedure according to the third scenario of the present embodiment.

Referring to FIG. 10A, when measurement for each component carrier is completed, the user equipment 100 transmits one measurement report for all of a plurality of component carriers to the base station 200a (step S222).

The base station 200a that has received the measurement report determines whether a handover is to be executed for all communication channels or a handover is to be executed for each component carrier based on the measurement report. Then, the base station 200a transmits one handover request message for all of a plurality of component carriers for which it is determined that the handover needs to be executed to the base station 200b (step S224). At this time, one handover request message includes information representing the number of component carriers to be included in a new communication channel with the user equipment 100. In this scenario, since the user equipment 100 is using 3 component carriers, information representing "the number of component carriers (CC number)=3" is included in the handover request message.

The base station 200b that has received the handover request messages determines the acceptable number of component carriers according to the availability of a communication service offered by itself or the like. Then, the base station 200b transmits a handover request confirm message including information representing the acceptable number of component carriers to the base station 200a in response to the handover request message (step S226). In other words, the base station 200b notifies the base station 200a of the number of component carriers for which the handover has been approved. In this scenario, as an example, it is assumed that two component carriers (for example, component carriers CC1 and CC2) are acceptable in the base station 200b. Thus, information representing "CC number=2" is included in the handover request confirm message.

The base station 200a that has received the handover request confirm message transmits a handover command for a number of component carriers for which the handover has been approved to the user equipment 100 (step S228). In this scenario, the handover command including information representing "CC number=2" is transmitted from the base station 200a to the user equipment 100.

The user equipment 100 that has received the handover command first acquires synchronization with the downlink channel of the component carrier CC1' of the base station 200b according to the information included in the handover command. Then, the user equipment 100 makes a random access to the base station 200b using a random access channel set to a given time slot of the component carrier CC1' (step S232). Further, the user equipment 100 acquires synchronization with the downlink channel of the component carrier CC2' of the base station 200b. Then, the user equipment 100 makes a random access to the base station 200b using a random access channel set to a given time slot of the component carrier CC2' (step S234). At this time, the base station 200a transfers data on the component carrier CC1 and CC2 among data addressed to the user equipment 100 to the base station 200b (step S236). Then, when the random access is successfully made on each component carrier, the user equipment 100 transmits a handover complete message to the base station 200b (step S242).

The base station 200b that has received the handover complete message requests the MME to update the route for the user equipment 100 (step S244). Upon updating the route of user data by the MME, the user equipment 100 can communicate with another device through a new base station (i.e. the base station 200b). The route update request may be made for each component carrier or may be made once over a plurality of component carriers. Then, the base station 200b transmits an acknowledgement to the user equipment 100 in response to the received handover complete message (step S246).

Referring to FIG. 10B, thereafter, the base station 200b can determine that it can accept the handover on the remaining component carrier (for example, the component carrier CC3) according to the availability of a communication service. Thus, the base station 200b transmits the handover request confirm message including information representing the number of component carriers for which the handover has been newly approved to the base station 200*a* (step S256). In this scenario, as an example, information representing "CC number=1" can be included in the handover request confirm message.

The base station 200*a* that has received the handover request confirm message transmits a handover command for the component carrier CC3 for which the handover has been newly approved to the user equipment 100 (step S258).

The user equipment 100 that has received the handover command acquires synchronization with the downlink channel of the component carrier CC3' of the base station 200*b*. Then, the user equipment 100 makes a random access to the base station 200*b* using a random access channel set to a given time slot of the component carrier CC3' (step S264). At this time, the base station 200*a* transfers data addressed to the user equipment 100 to the base station 200*b* (step S266). Then, when the random access is successfully made on the component carrier CC3', the user equipment 100 transmits a handover complete message to the base station 200*b* (step S272).

The base station 200*b* that has received the handover complete message requests the MME to update the route for the user equipment 100 when the route update request is made for each component carrier (step S274). Then, the base station 200*b* transmits an acknowledgement to the user equipment 100 in response to the received handover complete message for the component carrier CC3 (step S276).

In this scenario, the handover command for the component carrier for which the handover has been approved by the base station 200*b* among a plurality of component carriers is transmitted from the base station 200*a* to the user equipment 100. Then, the user equipment 100 tries to make a random access to the base station 200*b* for each component carrier in response to the handover command. Thus, the handover procedure can be carried out for each component carrier.

Further, one handover request for all of a plurality of component carriers is transmitted from the base station 200*a* to the base station 200*b*. The handover request includes information representing the number of component carriers to be included in a new communication channel between the user equipment 100 and the base station 200*b*. Further, the base station 200*a* is notified of the number of component carriers for which the handover is approved by the base station 200*b* in response to the handover request using the handover request confirm message. Thus, the number of handover request messages and handover request confirm messages which are exchanged between base stations can be reduced, and traffic between base stations can be reduced.

[4-4. Fourth Scenario]

Figure 11:
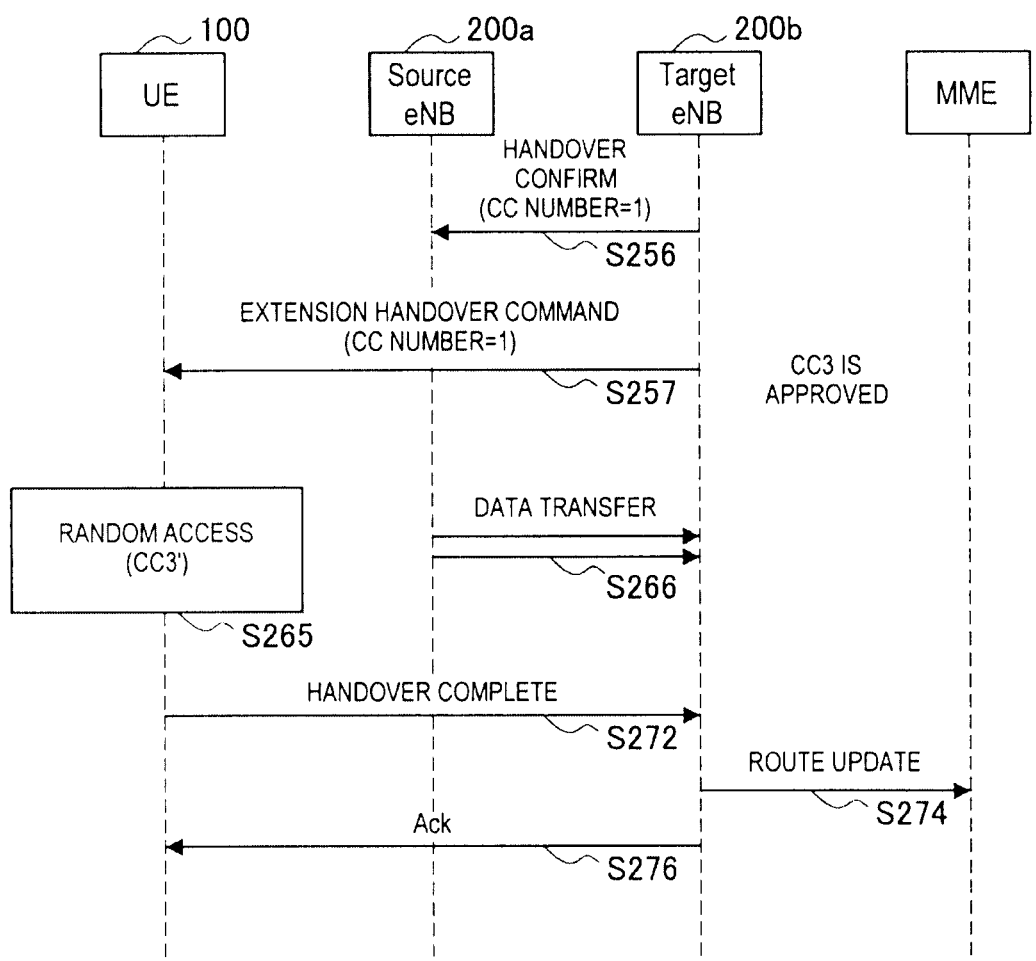
FIG. 11 is a second half portion of a sequence diagram illustrating an example of the flow of a handover procedure according to a fourth scenario.

FIG. 11 is a second half portion of a sequence diagram illustrating an example of the flow of the handover procedure according to the fourth scenario of the present embodiment. A first half portion of the handover procedure according to this scenario is the same as the first half portion of the third scenario described with reference to FIG. 10A.

In FIG. 11, it is assumed that the handover has been completed on the two component carriers CC1 and CC2 by the procedure described with reference to FIG. 10A. The base station 200*b* can determine that it can accept the handover on the remaining component carrier (for example, the component carrier CC3) according to the availability of a communication service. Thus, the base station 200*b* transmits a handover request confirm message including information representing the number of component carriers for which the handover has been newly approved to the base station 200*a* (step S256). Further, the base station 200*b* transmits a handover command including the same information to the user equipment 100 (step S257). As described above, in FIG. 11, a handover command transmitted from the target base station rather than the source base station is represented as an extension handover command. The extension handover command is transmitted via a communication channel previously formed between the target base station and the user equipment by the stepwise handover.

The user equipment 100 that has received the extension handover command makes a random access to the base station 200*b* using a random access channel set to a given time slot of the component carrier CC3' (step S265). In this scenario, the process of acquiring synchronization with the downlink channel of the component carrier CC3' of the base station 200*b* may not be performed. At this time, the base station 200*a* that has received the handover request confirm message transfers data addressed to the user equipment 100 to the base station 200*b* (step S266). Then, when the random access is successfully made on the component carrier CC3', the user equipment 100 transmits a handover complete message to the base station 200*b* (step S272).

The base station 200*b* that has received the handover complete message requests the MME to update the route for the user equipment 100 when the route update request is made for each component carrier (step S274). Then, the base station 200*b* transmits an acknowledgement to the user equipment 100 (step S276).

In this scenario, the extension handover command is transmitted from the base station 200*b* to the user equipment 100 via the communication channel formed by the stepwise handover. Thus, the handover command can be reliably transferred via the stabilized communication channel with the higher channel quality after the handover. The extension handover command described in this scenario can be applied even to the handover procedures according to the first and second scenarios.

[4-5. Exemplary Configuration of Message]

As described above, in the handover procedures according to the third and fourth scenarios, the information representing the number of component carriers that need the handover may be included in the handover request message to be transmitted from the base station 200*a* to the base station 200*b*. The handover request message may include a list of identifiers of component carriers that need the handover in addition to the information representing the number of component carriers.

Further, in the first to fourth scenarios, the handover request message may include information related to an arrangement of component carriers which are to configure a new communication channel in the base station 200*b*. The information related to an arrangement of component carriers may refer to information for designating a classification such as "contiguous" or "near." For example, when "contiguous" is included in the handover request message, the base station 200*b* sets up component carriers so that component carriers after the handover can be contiguous to each other. Further, for example, when "near" is included in the handover request message, the base station 200*b* sets up component carriers so that a distance between component carriers after the handover in the frequency direction can be a given threshold value or less. As described above, since an arrangement of component carriers which are to configure a new communication channel on the target base station can be designated, the handover can be performed in radio communication involving carrier aggregation to be brought into conformity with the capability of each user equipment.

<5. Summary>

The user equipment 100 and the base station 200 included in the radio communication system 1 according to an embodiment of the present invention have been described above with reference to FIGS. 4 to 11. According to the present embodiment, as described above, at the time of handover in radio communication involving carrier aggregation, a handover command for a component carrier for which a handover has been approved by a target base station among a plurality of component carriers is transmitted from a base station to user equipment. The user equipment tries to makes an access to the target base station in response to the handover command for each component carrier. Thus, the handover procedure can be carried out for each component carrier. Thus, the handover can be completed early on a number of component carriers which can be secured in the target base station. Further, in order to prevent the deterioration in the communication quality on some component carriers, only an access destination of a specific component carrier can be changed to another base station. That is, an efficient and flexible operation of the carrier aggregation can be implemented.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

1 Radio communication system
100 User equipment
110 Radio communication unit
160 Control unit
200 Base station
210 Radio communication unit
280 Control unit

The invention claimed is:

1. A method for performing a handover from a first base station to a second base station by a user equipment that is performing radio communication over a communication channel formed by an aggregation of a plurality of component carriers, the method comprising the steps of:
    transmitting a first handover command for one or more component carriers among the plurality of component carriers for which the handover has been approved by the second base station from the first base station to the user equipment;
    transmitting a second handover command for one or more remaining component carriers among the plurality of component carriers, the one or more remaining component carriers not including the one or more component carriers of the first handover command, from the first base station or the second base station to the user equipment; and
    trying to make an access from the user equipment to the second base station for each component carrier among the plurality of component carriers in response to at least one of the first handover command and the second handover command.

2. The method according to claim 1, further comprising a step of transmitting one measurement report for all of the plurality of component carriers from the user equipment to the first base station.

3. The method according to claim 1, further comprising a step of transmitting one measurement report for each of the plurality of component carriers from the user equipment to the first base station.

4. The method according to claim 1, further comprising a step of transmitting one handover request for all of the plurality of component carriers from the first base station to the second base station,
    wherein the handover request includes information representing a number of component carriers which are to be included in a new communication channel.

5. The method according to claim 1, further comprising a step of transmitting one handover request for each of the plurality of component carriers from the first base station to the second base station.

6. The method according to claim 4, further comprising a step of performing notification of a number of component carriers for which the handover has been approved among the plurality of component carriers from the second base station to the first base station.

7. The method according to claim 4, wherein the handover request includes information related to an arrangement of component carriers which are to configure a communication channel between the user equipment and the second base station after a handover.

8. The method according to claim 1, wherein the second handover command is an extended handover command for instructing a handover for the second component carrier via a communication channel formed, in response to the first handover command, from the second base station to the user equipment.

9. A user equipment, comprising:
    a radio communication interface that performs radio communication with a base station over a communication channel formed by an aggregation of a plurality of component carriers; and
    circuitry configured to control a handover of the radio communication unit from a first base station to a second base station;
    wherein the circuitry is configured to:
        receive a first handover command for one or more component carriers among the plurality of component carriers for which the handover has been approved by the second base station from the first base station through the radio communication interface,
        receive a second handover command for one or more remaining component carriers among the plurality of component carries, the one or more remaining component carriers not including the one or more component carriers of the first handover command, from the first base station or the second base station through the radio communication interface, and
        then cause the radio communication interface to try to make an access to the second base station for each component carrier among the plurality of component carriers in response to at least one of the first handover command and the second handover command.

10. A base station, comprising:
    a radio communication interface that performs radio communication with a user equipment over a communication channel formed by an aggregation of a plurality of component carriers; and
    circuitry configured to control a handover by the user equipment,
    wherein the circuitry is configured to:
        decide execution of the handover from the base station to another base station by the user equipment,
        then transmit a first handover command for one or more component carriers among the plurality of component carriers for which the handover has been approved by the another base station to the user equipment through the radio communication interface, and then transmit a second handover command for one or more remaining component carriers among the plurality of component carriers, the one or more remaining component carriers not including the one or more component carriers of the first handover command, to the user equipment through the radio communication interface.

11. A radio communication system, comprising:

a user equipment that performs radio communication over a communication channel formed by aggregating a plurality of component carriers;

a first base station that provides the user equipment with a communication service over the communication channel; and a second base station that is a target of a handover from the first base station by the user equipment, wherein the first base station is configured to:
decide execution of the handover from the first base station to the second base station by the user equipment, and then transmit a first handover command for one or more component carriers among the plurality of component carriers for which the handover has been approved by the second base station to the user equipment, wherein the first base station or the second base station is configured to then transmit a second handover command for one or more remaining component carriers among the plurality of component carriers, the one or more remaining component carriers not including the one or more component carriers of the first handover command, to the user equipment, and wherein the user equipment is configured to try to make an access to the second base station for each component carrier among the plurality of component carriers in response to at least one of the first handover command and the second handover command.

12. The method according to claim 1, wherein the second handover command is transmitted from the first base station to the user equipment.

* * * * *